(12) United States Patent
Costanzo et al.

(10) Patent No.: US 7,191,894 B2
(45) Date of Patent: Mar. 20, 2007

(54) VARIABLE ANGLED-ROLLER BELT AND CONVEYOR

(75) Inventors: Mark Costanzo, River Ridge, LA (US); Matthew L. Fourney, Savage, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/907,524

(22) Filed: Apr. 4, 2005

(65) Prior Publication Data

US 2006/0219526 A1    Oct. 5, 2006

(51) Int. Cl.
*B65G 47/26* (2006.01)
(52) U.S. Cl. ................... 198/457.05; 198/370.09; 198/461.1; 198/817; 198/833
(58) Field of Classification Search ........... 198/457.02, 198/461.1, 370.09, 817, 833, 779, 790, 802, 198/850
See application file for complete search history.

(56) References Cited

U.S. PATENT DOCUMENTS

| 1,931,454 A | 10/1933 | Anderson ............... 198/127 |
| 2,566,417 A | 9/1951 | Holm ..................... 198/31 |
| 3,973,672 A | 8/1976 | Frost .................... 198/283 |
| 4,044,897 A | 8/1977 | Maxted ................. 214/11 R |
| 4,143,756 A | 3/1979 | Chorlton ............... 198/457 |
| 4,264,002 A | 4/1981 | Van Der Schie ....... 198/365 |
| 5,074,405 A | 12/1991 | Magolske et al. | |
| 5,090,553 A * | 2/1992 | Focke .................. 198/377.06 |
| 5,092,447 A | 3/1992 | Wyman ................. 198/374 |
| 5,101,958 A | 4/1992 | LeMay et al. ......... 198/436 |
| 5,145,049 A | 9/1992 | McClurkin ............ 198/374 |
| 5,333,722 A | 8/1994 | Ouellette | |
| 5,400,896 A | 3/1995 | Loomer ................ 198/415 |
| 5,551,543 A | 9/1996 | Mattingly et al. ..... 198/370.09 |
| 6,073,747 A | 6/2000 | Takino et al. ......... 198/370.09 |
| 6,148,990 A * | 11/2000 | Lapeyre et al. ............. 198/779 |
| 6,269,933 B1 | 8/2001 | Schuitema et al. ......... 198/446 |
| 6,318,544 B1 * | 11/2001 | O'Connor et al. .......... 198/853 |
| 6,367,616 B1 * | 4/2002 | Lapeyre et al. ............ 198/779 |
| 6,401,936 B1 | 6/2002 | Isaacs et al. .............. 209/656 |
| 6,494,312 B2 | 12/2002 | Costanzo ................. 198/779 |
| 6,568,522 B1 * | 5/2003 | Boelaars ................. 198/347.2 |
| 6,571,937 B1 | 6/2003 | Costanzo et al. ......... 198/779 |
| 6,681,922 B2 | 1/2004 | Corley et al. ............ 198/853 |
| 6,758,323 B2 | 7/2004 | Costanzo ............... 198/457.02 |
| 6,923,309 B2 * | 8/2005 | Costanzo ................. 198/411 |
| 6,986,420 B2 * | 1/2006 | Weiser et al. ............ 198/853 |
| 6,997,306 B2 * | 2/2006 | Sofranec et al. .......... 198/779 |
| 7,007,792 B1 * | 3/2006 | Burch .................. 198/457.02 |

(Continued)

FOREIGN PATENT DOCUMENTS

JP    03-088617 A    4/1991

(Continued)

*Primary Examiner*—Douglas A. Hess
(74) *Attorney, Agent, or Firm*—James T. Cronvich

(57) ABSTRACT

A conveyor constructed of a single belt or a plurality of abutting belts arranged side by side in the conveyor, in which the belt or belts have rollers arranged to rotate on axes oriented at multiple angles oblique to the direction of belt travel. A gradual or monotonic, stepped change in the axes of the rollers across the width of the conveyor can be used to make a conveyor capable of converting a mass flow of articles into a single stream of separated articles.

23 Claims, 5 Drawing Sheets

U.S. PATENT DOCUMENTS

| | | | |
|---|---|---|---|
| 2005/0023105 A1 | 2/2005 | Costanzo et al. | 198/35 MD |
| 2005/0072656 A1 | 4/2005 | Costanzo | 198/779 |
| 2005/0109582 A1 | 5/2005 | Fourney | 198/779 |
| 2006/0032727 A1* | 2/2006 | Burch | |
| 2006/0070855 A1* | 4/2006 | Lemm | |
| 2006/0070857 A1 | 4/2006 | Fourney | |

FOREIGN PATENT DOCUMENTS

| | | |
|---|---|---|
| JP | 08-277029 A | 10/1996 |

* cited by examiner

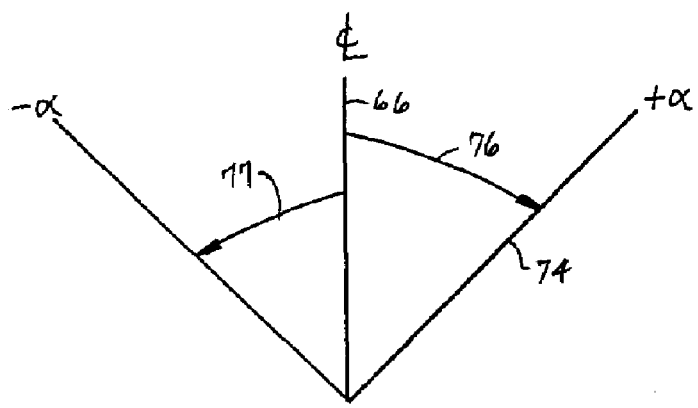
FIG. 4
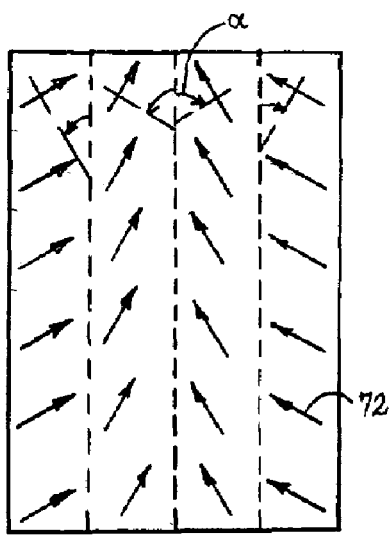
FIG. 5A
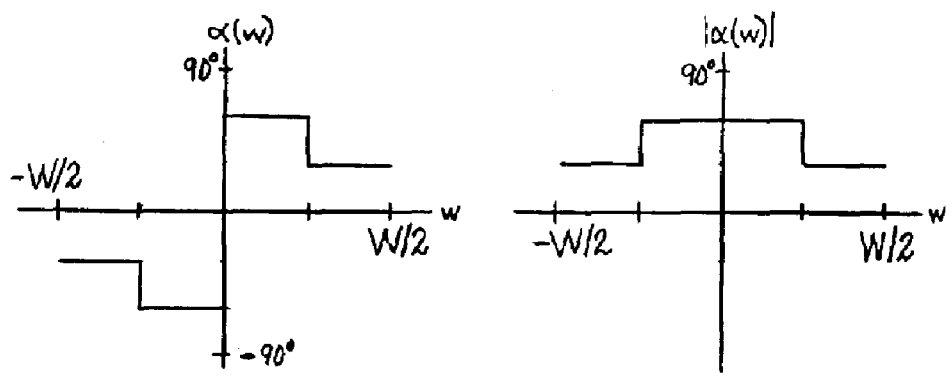
FIG. 5B
FIG. 5C

VARIABLE ANGLED-ROLLER BELT AND CONVEYOR

BACKGROUND

The invention relates generally to power-driven conveyors and, more particularly, to conveyors constructed of one or more conveyor belts having article-supporting rollers arranged to rotate on axes oriented at multiple angles relative to the direction of belt travel.

Singulating conveyors are used to convert a bulk flow of conveyed articles into a single stream of individual articles separated in the direction of flow. Roller conveyors in various configurations with and without associated conveyor belts are often used for this purpose. But roller conveyors are notoriously noisy and subject to wear. Modular roller-top conveyor belts have also been used in applications requiring the de-clustering of a cluster of conveyed articles. In particular, modular roller-top conveyor belts with rollers arranged to rotate about axes oblique to the direction of flow are used to direct conveyed articles to a side or center of the belt for delivery to a downstream or center conveyor belt driven at a higher speed to separate articles from one another. But these schemes require the use of multiple belts in series or parallel belts driven at different speeds, making for a complicated drive assembly and belt arrangement.

Thus, there is a need for a conveyor system capable of de-clustering a mass flow of articles without the shortcomings of conventional singulating conveyors.

SUMMARY

This need and other needs are satisfied by a conveyor and modular conveyor belt embodying features of the invention. One version of such a conveyor comprises one or more conveyor belts forming a continuous conveying surface that extends longitudinally in a direction of belt travel and laterally in width from a first side to a second side. An underside is formed opposite the conveying surface. Rollers in the one or more conveyor belts have salient portions protruding beyond the conveying surface and the underside. A bearing surface underlies the one or more conveyor belts. The salient portions of the rollers protruding beyond the underside roll on the bearing surface in rolling contact as the one or more belts advance in the direction of belt travel. The one or more conveyor belts are divided laterally into one or more longitudinal lanes. All the rollers in a lane are arranged to rotate about oblique axes that form at least two different acute angles measured in the same direction from the direction of belt travel.

Another version of a conveyor comprises one or more conveyor belts that form a continuous conveying surface extending longitudinally in a direction of belt travel and laterally from a first side to a second side. An underside is formed opposite the conveying surface. Rollers are arranged in the one or more conveyor belts with salient portions of the rollers protruding beyond the conveying surface and the underside of the one or more belts. A bearing surface underlies the one or more belts. The salient portions of the rollers protruding beyond the underside roll on the bearing surface in rolling contact as the one or more belts advance in the direction of belt travel. The rollers are arranged to rotate about oblique axes forming at least two different acute angles measured in the same direction from the direction of belt travel. The acute angle measured from the longitudinal centerline midway between the first and second sides of each roller is described by a function $\alpha(w)$, where $w$ is the position of the roller across the width $W$ of the belt measured from the centerline ($w=0$) between the first side ($w=-W/2$) and the second side ($w=+W/2$).

Yet another version of a conveyor comprises one or more conveyor belts that form a continuous conveying surface extending longitudinally in a transport direction and laterally in width from a first side to a second side. An underside is formed opposite the conveying surface. Rollers are arranged in the one or more conveyor belts with salient portions protruding beyond the conveying surface and the underside. Underlying the one or more conveyor belts is a bearing surface. The salient portions of the rollers protruding beyond the underside are in contact with the bearing surface. Relative motion between the one or more conveyor belts and the bearing surface causes the rollers to rotate. The rollers are arranged to rotate to exert at least three differently directed force vectors oblique to the transport direction to articles conveyed atop the salient portions of the rollers protruding beyond the conveyor surface.

Still another version of a conveyor comprises a modular conveyor belt constructed of a series of rows of one or more belt modules. Each row extends longitudinally in a direction of belt travel from a first end to a second end. The rows are connected together, first end to second end, at hinge joints to form a modular conveyor belt extending laterally in width from a first side to a second side and in thickness from an outer surface to an inner surface. The belt is further defined by a longitudinal centerline midway between the first and second sides. Rollers disposed in at least some of the rows have salient portions protruding beyond the outer and inner surfaces of the belt. A bearing surface underlies the modular conveyor belt. The salient portions of the rollers protruding beyond the inner surface roll along the bearing surface in rolling contact as the modular conveyor belt advances longitudinally in the direction of belt travel. The rollers are arranged to rotate on axes defining with the longitudinal centerline at least three distinct acute angles.

BRIEF DESCRIPTION OF THE DRAWINGS

These features and aspects of the invention, as well as its advantages, are better understood by reference to the following description, appended claims, and accompanying drawings, in which:

FIG. 4 is a geometrical representation of the roller-axis angle convention used to describe the operation of the rollers in a conveyor as in FIG. 1;

FIG. 5A is a top plan representation of force vectors imparted by the rollers in the conveyor depicted in FIG. 2, FIG. 5B is a graph of the roller-axis angle $\alpha$ as a function of lateral position across the width of the conveyor depicted in FIG. 2, and FIG. 5C is a graph of the magnitude of the roller-axis angle $\alpha$ of FIG. 5B;

DETAILED DESCRIPTION

Figure 1:
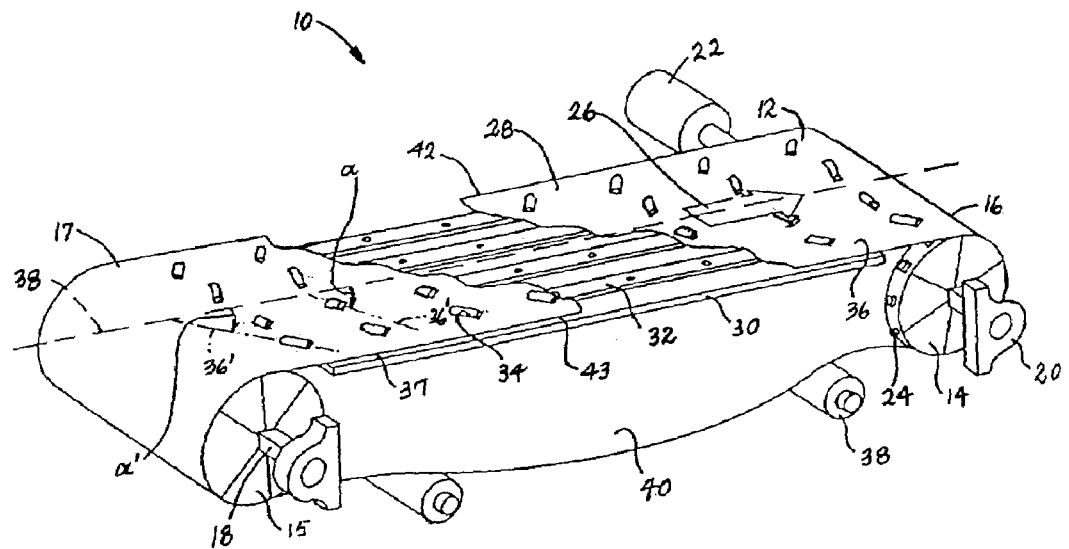
FIG. 1 is a cutaway pictorial view of one version of a conveyor embodying features of the invention.

A conveyor embodying features of the invention is illustrated in FIG. 1. The conveyor 10 shown in this example comprises an endless conveyor belt 12 trained between a drive sprocket set 14 at an exit end 16 of the conveyor and an idler sprocket set 15 at an entrance end 17 of the conveyor. The sprocket sets are mounted on shafts 18 supported for rotation and roller bearings 20 at each end of the shafts. A drive motor 22 is coupled to the drive shaft to rotate the sprockets. Engagement structure, such as teeth 24, on the peripheries of the sprockets engages drive structure in the belt to drive and track the belt in a transport direction, or direction of travel 26. If the belt is a flat belt, it may be driven by drive and idler pulleys, instead of being sprocket-driven. If the belt includes drive-receiving structure, it may be sprocket-driven, as described, or driven by drums, including motorized drums.

The belt is supported along an upper carryway 28 on a carryway pan 30 or other adequate framework. Wearstrips 32 supported on the pan extend longitudinally in the direction of belt travel and underlie rollers 34 protruding from a top conveying surface of the belt and an opposite underside 37. The wearstrips form bearing surfaces along which the rollers roll as the belt advances in the direction of belt travel. Individual wear strips may be replaced by a continuous wearsheet. The roller bearings 20 and the carryway pan are all mounted in a conveyor frame (not shown, to simplify the drawing). The belt is supported on shoes, drums, or rollers 38 to reduce belt sag along a returnway 40.

The conveyor belt, which may be a single belt or a side-by-side arrangement of abutting belts, extends laterally from a first side 42 to a second side 43. The rollers 34 rotate about oblique axes 36, 36' forming different acute angles α, α' with the centerline 38 of the belt. The roller-axis angles near the second side 43 of the belt are measured in a clockwise direction from the belt centerline. The angles of the roller axes nearer the first side 42 are measured in a counter-clockwise direction. Preferably the roller axes on one side of the centerline are mirror images of those on the other side.

Figure 2:
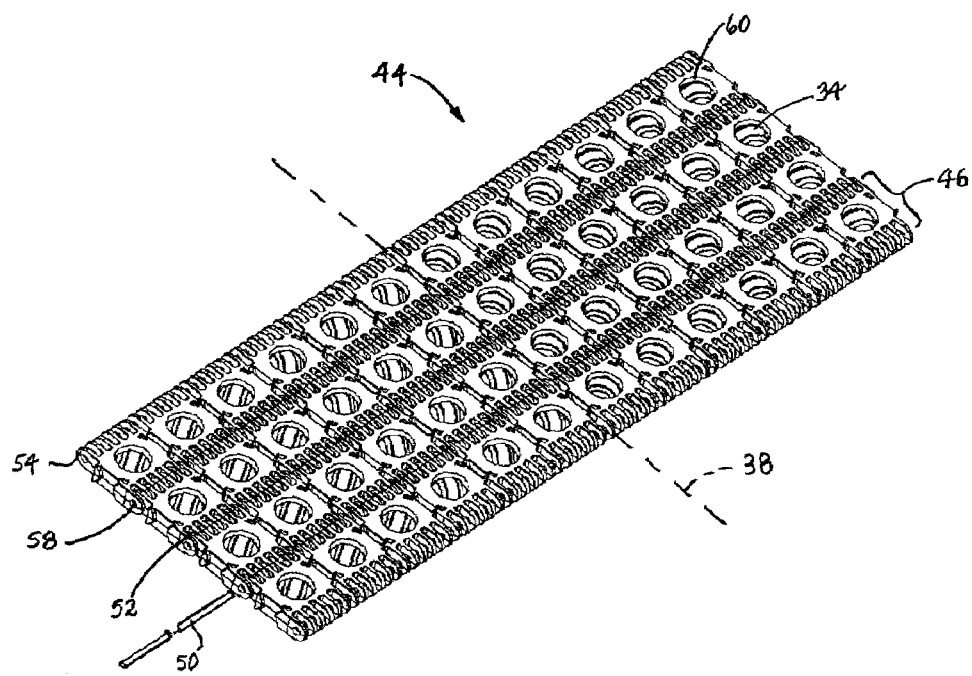
FIG. 2 is an isometric view of a few rows of a belt module usable in a conveyor as in FIG. 1.

Although the belt could be one or more flat belts, it is preferably one or more modular plastic conveyor belts 44 as shown in FIG. 2. (In fact, the generic term "conveyor belt" as used in this description and in the claims includes, without limitation, flat conveyor belts, modular plastic conveyor belts, single-strand conveyor chain, and slat conveyor chain. If a specific kind of conveyor belt is meant in a particular instance, the term will be modified to specify the limited meaning for that instance.) The belt is constructed of a series of rows 46 of one or more belt modules connected together end to end by hinge pins 50 at hinge joints 52 between adjacent rows. Hinge elements 54 along the ends of each row of belt modules interleave with hinge elements of an adjacent row at each hinge joint. Aligned apertures through the hinge elements form a lateral passageway 58 to receive the hinge pin. The belt is preferably constructed in a bricklay pattern for strength, but it could consist of a single module per row or could have modules of equal width arranged in single files along the length of the belt. Modular plastic conveyor belts are typically made of thermoplastic polymers, such as polypropylene, polyethylene, acetal, or composite materials, in an injection molding process. Intralox, L.L.C., of Harahan, La., USA, is one manufacturer of modular plastic conveyor belts.

The rollers 34 in the modular belt shown in FIG. 2 are generally cylindrical in shape and reside in recesses 60 formed in the belt modules. A central bore through the rollers receives an axle whose ends are embedded in the interior of the module through the walls of the recesses in a preferred version of the roller belt. But the rollers could be formed with stubs that are received in journaling openings in the walls for rotation. In either case, the axles or the stubs define an axis of rotation oblique to the longitudinal centerline 38 of the belt. The rollers in this example are arranged to rotate about axes oriented at four different angles relative to the centerline.

Figure 3A:
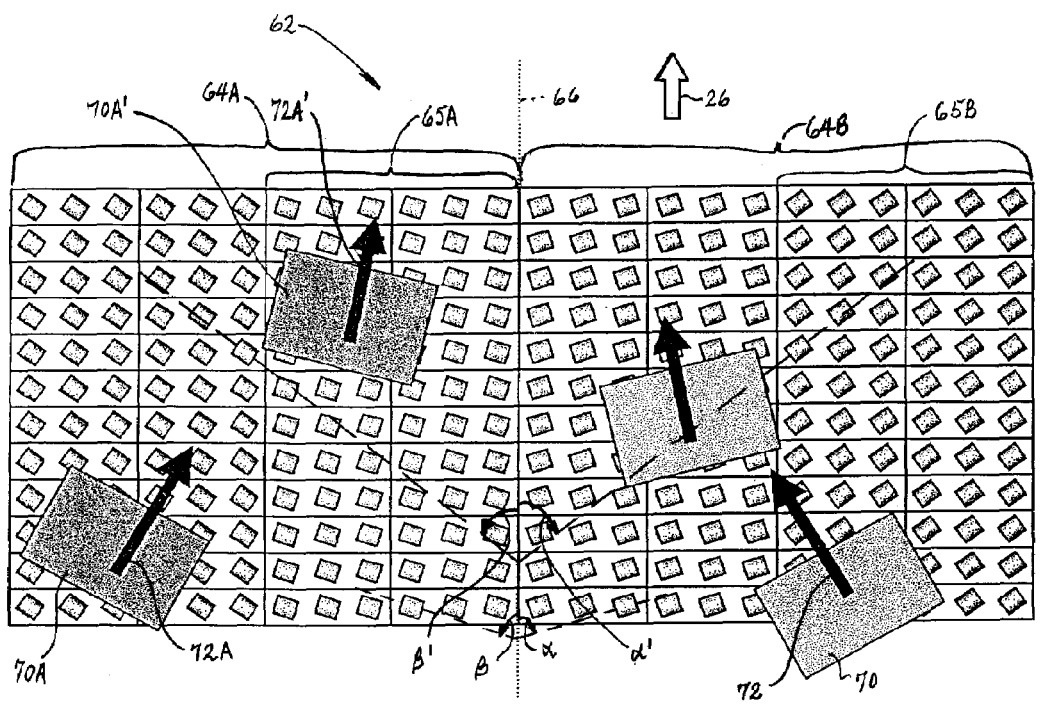
FIG. 3A is a top plan schematic representation of a portion of the conveyor of FIG. 1 along the carryway.
Figure 3B:
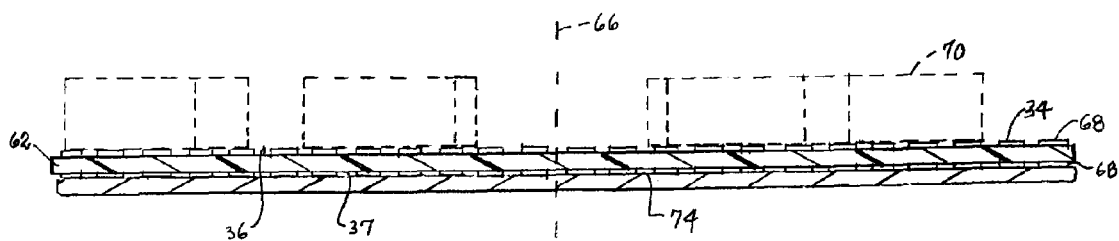
FIG. 3B is a front elevation schematic of the conveyor representation of FIG. 3A.

This arrangement of rollers is also shown in FIG. 3A. In this example, the conveyor belt or belts 62 are divided laterally into two longitudinal lanes 64A and 64B separated by a longitudinal centerline 66. The rollers in each lane are arranged to rotate about oblique axes forming different acute angles α, α' and β, β' with the centerline. In a preferred versions, β=−α, and β'=−α'. Because, as shown in FIG. 3B, salient portions 68 of the rollers 34 protrude beyond the article-conveying surface 36 and the underside 37 of the belt 62, articles 70 conveyed atop the rollers are propelled by forces 72 caused by the rollers rolling along an underlying bearing surface 74 as the belt advances in a transport direction. As shown in FIG. 3A, an article 70A in the left lane 64A of the belt is acted upon by an oblique force vector 72A generally perpendicular to the axis of the rollers on the leftmost side of the belt. The force vector has a lateral component urging the article toward the other side of the belt. Eventually the article 70A' is pushed atop the rollers in the left lane of the belt in which the roller axes are arranged on a greater angle β' from the centerline. This directs the force 72A' more in the direction of belt travel 26. Because the rollers in the right lane 64B are arranged generally to mirror those in the left lane, articles conveyed on the belt are urged by mirror-image force vectors toward the centerline. Once the articles approach the centerline, they are accelerated more in the direction of belt travel to achieve greater longitudinal separation. Thus, a conveyor using a belt such as this can convert a mass flow of articles into a stream of individual articles separated from each other.

The conveyor belt or belts of FIG. 3A are represented schematically in FIG. 5A. The arrows represent the direction of the force vectors 72 acting on articles conveyed atop the belt. The vectors are drawn perpendicular to the axes of the rollers in each lane. For a given belt row or lateral traverse of the belt, the orientation of the rollers is described by a function α(w). For a belt with a roller configuration as represented by FIG. 5A, the function α(w) is graphed in FIG. 5B. By the convention shown in FIG. 4, the axis 74 of a roller forms an acute angle with respect to the centerline 66 of the belt. If the acute angle (+α) is measured clockwise 76 from the centerline, the angle α is defined as a positive angle. If the acute angle (−α) is measured counterclockwise 77 from the centerline, the angle α is defined as a negative angle. Under this convention, the function α(w) corresponding to the belt of FIG. 5A is given by the graph of FIG. 5B. The horizontal axis in FIG. 5B is the lateral position w across the width W of the belt. If the centerline is arbitrarily chosen to be at w=0, the belt extends from −W/2 to +W/2. The vertical axis represents the angle of the axis of the roller measured with respect to the centerline as in FIG. 4. FIG. 5B shows that the roller-axis angles at the left side of the belt are all parallel to each other at a first acute angle of about −30° until they jump to about −60° in a longitudinal column 65A closer to the centerline. Moving right past the centerline, the angles jump to about +60° and then change to about +30° in a longitudinal column 65B nearest the right side of the belt. In this example, α is an odd function of w, i.e., α(w)=−α(−w). The absolute value, or magnitude, of the acute angles |α(w)| is graphed in FIG. 5C. This shows that the magnitude of the angles of the roller axes increase monotonically with distance from each side of the belt toward the centerline, in this example.

Figure 6A:
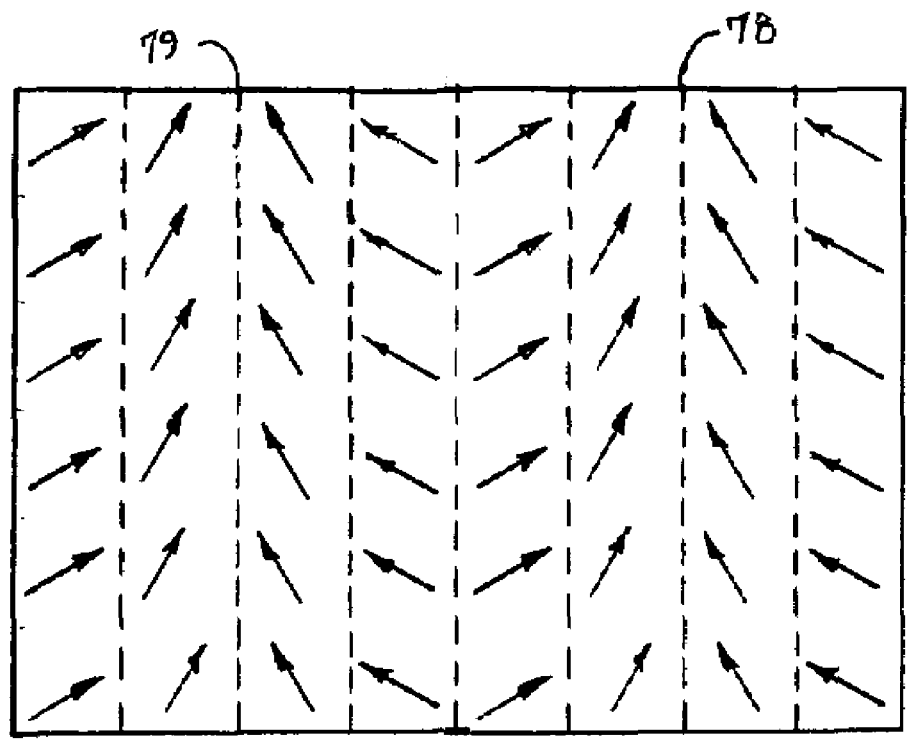
FIG. 6A is a top plan representation of force vectors in another version of conveyor as in FIG. 1, but having two streams of articles across the width of the conveyor.
Figure 6B:
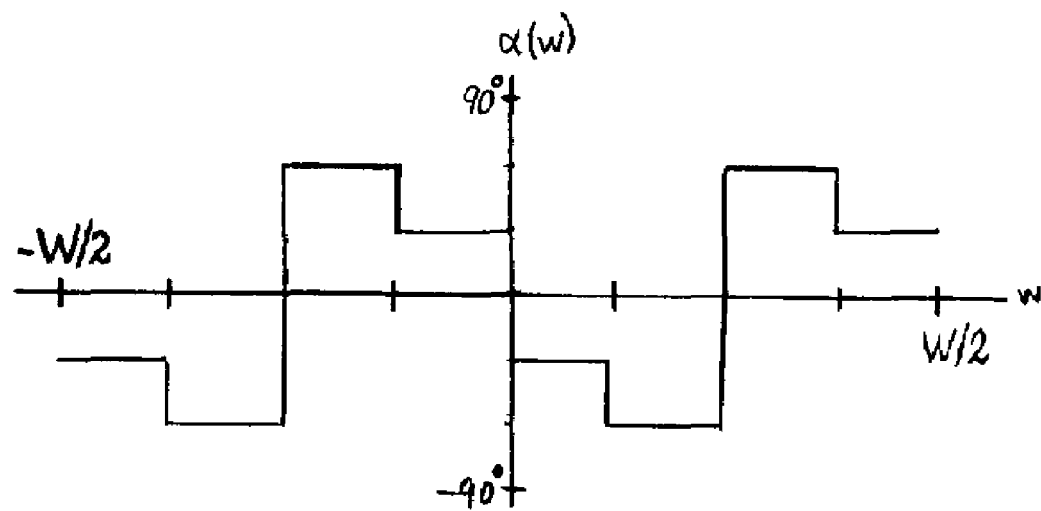
FIG. 6B is a graph of the roller-axis angle $\alpha$ as a function of lateral position across the width of the conveyor.

FIGS. 6A and 6B represent a conveyor that directs conveyed articles to two laterally spaced exit points 78, 79. The conveyor represented in FIG. 6A may be constructed of a single belt or of more than one belt. For example, it may be made up of two single belts as in FIG. 3A abutted side by side to form a continuous top conveying surface along the carryway. For this case, the function α(w) repeats itself across the width of the conveyor, as shown in FIG. 6B. Of course, more than two exit points can be made by adding more lanes of similarly arranged rollers.

Figure 7A:
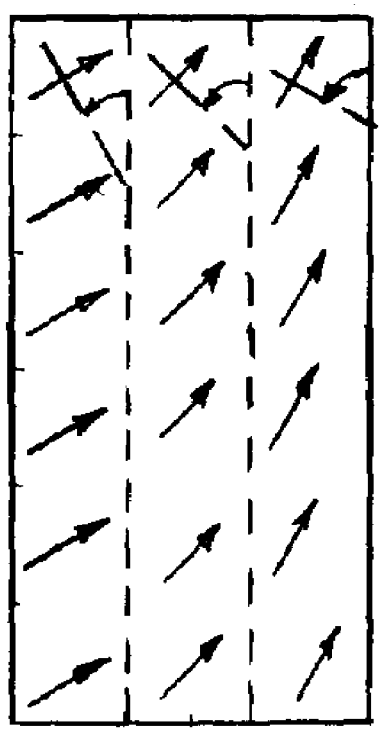
FIG. 7A is a top plan representation of force vectors in another version of conveyor as in FIG. 1, but having a stream of articles aligned along one side of the conveyor.
Figure 7B:
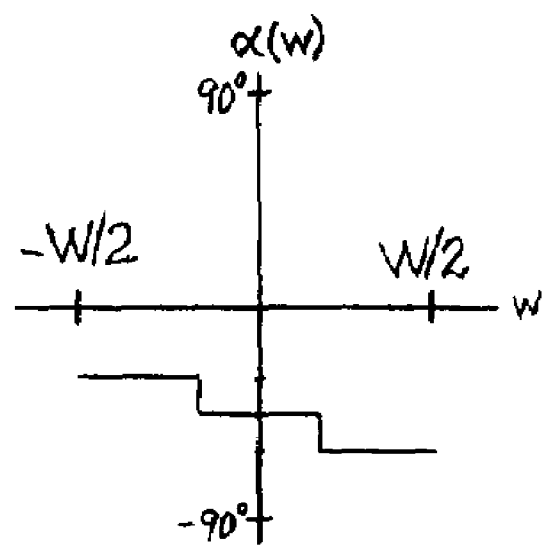
FIG. 7B is a graph of the roller-axis angle α as a function of lateral position across the width of the conveyor.

FIGS. 7A and 7B represent a conveyor for which the rollers are arranged to rotate about three different axial directions across the width of the conveyor. Because the angle function α(w) gets close to −90° with distance from the left side of the belt, this represents a belt that urges articles toward the right side of the belt where they are gradually separated longitudinally. Such a belt would preferably include a right-side rail to prevent articles from dropping off the side.

Although the invention has been described in detail with respect to a few preferred versions, other versions are possible. For example, more lanes can be formed across the width of the conveyor and the steps in roller-axis angles from lane to lane can be decreased in magnitude. Some belt constructions may include longitudinally aligned rollers at different axis angles, especially at the transitions from one angled group to another to make belt construction in a bricklay pattern simpler. As yet another example, the conveyor belt can be stationary with a dynamic bearing surface, such as a flat belt or a modular friction-top belt, advancing in a transport direction relative to the belt to actuate the rollers to propel conveyed articles atop the rollers. So, as these few examples suggest, the scope of the invention is not meant to be limited to the preferred versions described in detail.

What is claimed is:

1. A conveyor comprising:
   one or more conveyor belts forming a continuous conveying surface extending longitudinally in a direction of belt travel and laterally in width from a first side to a second side and further forming an underside opposite the conveying surface;
   a plurality of rollers arranged in the one or more conveyor belts with salient portions of the rollers protruding beyond the continuous conveying surface and the underside;
   a bearing surface underlying the one or more conveyor belts with the salient portions of the rollers protruding beyond the underside in rolling contact with the bearing surface as the one or more conveyor belts advance longitudinally in the direction of belt travel;
   wherein the one or more conveyor belts are divided laterally into one or more longitudinal lanes in which all the rollers in a longitudinal lane are arranged to rotate on oblique axes forming at least two different acute angles measured in the same direction from the direction of belt travel.

2. A conveyor as in claim 1 wherein the at least two acute angles defining the oblique axes in a longitudinal lane vary monotonically across the longitudinal lane along the width of the one or more conveyor belts.

3. A conveyor as in claim 1 wherein the one or more conveyor belts are divided into a first longitudinal lane extending laterally from the first side to substantially midway between the first and second sides and a second longitudinal lane extending laterally from the second side to the first longitudinal lane, wherein the acute angles of the oblique axes of the rollers in the first longitudinal lane are mirror images of the angles of the oblique axes of the rollers in the second longitudinal lane.

4. A conveyor as in claim 1 wherein the one or more conveyor belts are divided into a first longitudinal lane extending laterally from the first side to substantially midway between the first and second sides and a second longitudinal lane extending laterally from the second side to the first longitudinal lane, wherein the acute angles of the oblique axes of the rollers in the first and second longitudinal lanes increase monotonically with distance from the first and second sides, respectively, of the one or more conveyor belts.

5. A conveyor as in claim 1 wherein the rollers positioned nearer the first and second sides of the one or more conveyor belts rotate on axes oriented to provide a more lateral component of force to conveyed articles than rollers positioned nearer a middle portion of the one or more conveyor belts between the first and second sides.

6. A conveyor comprising:
   one or more conveyor belts forming a continuous conveying surface extending longitudinally in a direction of belt travel and laterally in width from a first side to a second side and further forming an underside opposite the conveying surface;
   a plurality of rollers arranged in the one or more conveyor belts with salient portions of the rollers protruding beyond the continuous conveying surface and the underside;
   a bearing surface underlying the one or more conveyor belts with the salient portions of the rollers protruding beyond the underside in rolling contact with the bearing surface as the one or more conveyor belts advance longitudinally in the direction of belt travel;
   wherein the rollers are arranged to rotate on oblique axes forming at least two different acute angles measured in the same direction from the direction of belt travel and wherein the acute angle measured from the longitudinal centerline midway between the first and second sides of the one or more conveyor belts for each roller is described by a function α(w), where w is the lateral position of the roller across the width W of the belt measured from the longitudinal centerline (w=0) between the first side (w=−W/2) and the second side (w=+W/2).

7. A conveyor as in claim 6 wherein the magnitude of α(w) (|α(w)|) increases monotonically with distance from the first side to a maximum at the second side.

8. A conveyor as in claim 6 wherein the magnitude of α(w) (|α(w)|) increases monotonically with distance from the first and second sides up to the centerline.

9. A conveyor as in claim 6 wherein α(w) ranges between 0° and −90° for w<0 and between +90° and 0° for w>0.

10. A conveyor as in claim 6 wherein α(w)=−α(−w).

11. A conveyor as in claim 6 wherein α(w) has at least two discrete values for w<0 and at least two discrete values for w>0.

12. A conveyor as in claim 6 wherein α(w) is a periodic function of w, repeating itself across the width of the conveyor at least once.

13. A conveyor comprising:
one or more conveyor belts forming a continuous conveying surface extending longitudinally in a transport direction and laterally in width from a first side to a second side and further forming an underside opposite the conveying surface;
a plurality of rollers arranged in the one or more conveyor belts with salient portions of the rollers protruding beyond the continuous conveying surface and the underside;
a bearing surface underlying the one or more conveyor belts with the salient portions of the rollers protruding beyond the underside into contact with the bearing surface, wherein relative motion between the one or more conveyor belts and the bearing surface causes the rollers to rotate;
wherein the rollers are arranged to rotate to exert at least three differently directed force vectors oblique to the transport direction to articles conveyed atop the salient portions of the rollers protruding beyond the conveying surface.

14. A conveyor as in claim 13 wherein the rollers nearer the first side of the one or more conveyor belts exert a force vector having a component directed toward the second side.

15. A conveyor as in claim 14 wherein the rollers nearer the second side of the one or more conveyor belts exert a force vector having a component directed toward the first side.

16. A conveyor as in claim 13 wherein the force vectors provided by the rollers nearer the first side of the one or more belts are mirror images of the force vectors provided by the rollers nearer the second side.

17. A conveyor as in claim 13 wherein the force vectors vary in direction with the positions of their associated rollers across the width of the one or more conveyor belts.

18. A conveyor as in claim 13 wherein the rollers have axes of rotation generally perpendicular to their force vectors and are arranged in longitudinal columns with all the rollers in a column having parallel axes of rotation.

19. A conveyor comprising:
a modular conveyor belt including a series of rows of one or more belt modules extending longitudinally in a direction of belt travel from a first end to a second end and connected together first end to second end at hinge joints into a modular conveyor belt extending laterally in width from a first side to a second side and in thickness from an outer surface to an inner surface and defined by a longitudinal centerline midway between the first and second sides;
a plurality of rollers disposed in at least some of the rows and having salient portions protruding beyond the outer and inner surfaces of the belt;
a bearing surface underlying the modular conveyor belt with the salient portions of the rollers protruding beyond the inner surface in rolling contact with the bearing surface as the modular conveyor belt advances longitudinally in the direction of belt travel;
wherein the rollers are arranged to rotate on axes defining with the longitudinal centerline at least three distinct acute angles.

20. A modular conveyor belt comprising:
a series of rows of one or more belt modules extending longitudinally from a first end to a second end and connected together first end to second end at hinge joints into a modular conveyor belt extending laterally in width from a first side to a second side and in thickness from an outer surface to an inner surface and defined by a longitudinal centerline midway between the first and second sides;
a plurality of rollers disposed in at least some of the rows and having salient portions protruding beyond the outer and inner surfaces of the belt;
wherein the rollers are arranged to rotate on axes defining with the longitudinal centerline at least three distinct acute angles.

21. A modular conveyor belt as in claim 20 wherein the axes of the rollers on one side of the longitudinal centerline are mirror images of the axes of the rollers on the opposite side of the centerline.

22. A modular conveyor belt as in claim 20 wherein the axes of the rollers on one side of the centerline define two acute angles and wherein the axes of the rollers nearer the first side of the belt define a first acute angle less than a second acute angle defined by the axes of the rollers nearer the longitudinal centerline.

23. A modular conveyor belt as in claim 20 wherein the acute angles defined by the longitudinal centerline and the axes of the rollers vary with the lateral positions of the rollers across the width of the belt.

* * * * *